(12) United States Patent
Wang et al.

(10) Patent No.: US 7,102,854 B2
(45) Date of Patent: Sep. 5, 2006

(54) TRANSDUCING HEAD WITH REDUCED SIDE WRITING

(75) Inventors: Feng Wang, Lakeville, MN (US); Shaoping Li, Naperville, IL (US); Kaizhong Gao, Bloomington, MN (US); Song S. Xue, Edina, MN (US); Nurul Amin, Woodbury, MN (US); Rick P. Michel, Minneapolis, MN (US); Ibro M. Tabakovic, Edina, MN (US); Yuming Zhou, Lakeville, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 299 days.

(21) Appl. No.: 10/678,439

(22) Filed: Oct. 3, 2003

(65) Prior Publication Data

US 2005/0073774 A1    Apr. 7, 2005

(51) Int. Cl.
*G11B 5/147* (2006.01)
(52) U.S. Cl. .................................... 360/126
(58) Field of Classification Search ................ None
See application file for complete search history.

(56) References Cited

U.S. PATENT DOCUMENTS

| | | | |
|---|---|---|---|
| 5,157,570 A | 10/1992 | Shukovsky et al. | |
| 5,372,698 A | 12/1994 | Liao | |
| 6,122,144 A | 9/2000 | Chang et al. | |
| 6,278,591 B1 | 8/2001 | Chang et al. | |
| 6,393,692 B1 | 5/2002 | Ju et al. | |
| 6,490,131 B1 | 12/2002 | Sano et al. | |
| 6,501,619 B1 | 12/2002 | Sherrer et al. | |
| 6,504,675 B1 * | 1/2003 | Shukh et al. | 360/125 |
| 6,513,228 B1 | 2/2003 | Khizroev et al. | |
| 6,757,141 B1 * | 6/2004 | Santini et al. | 360/126 |
| 6,791,796 B1 * | 9/2004 | Shukh et al. | 360/126 |
| 6,809,899 B1 * | 10/2004 | Chen et al. | 360/125 |
| 2002/0034043 A1 | 3/2002 | Okada et al. | |
| 2002/0131203 A1 | 9/2002 | Litvinov et al. | |
| 2002/0141111 A1 | 10/2002 | Batra et al. | |

FOREIGN PATENT DOCUMENTS

EP    0 360 978 B1    12/1994

\* cited by examiner

*Primary Examiner*—R. S. Tupper
(74) *Attorney, Agent, or Firm*—Kinney & Lange, P.A.

(57) ABSTRACT

A transducing head has a main pole and at least one magnetic element (such as a return pole or a shield) which provides a potential return path for a magnetic field produced by the main pole. The magnetic element is spaced from the main pole. The magnetic element is formed at least in part of a magnetic material having a material property that reduces side writing at the magnetic element.

31 Claims, 7 Drawing Sheets

TRANSDUCING HEAD WITH REDUCED SIDE WRITING

CROSS-REFERENCE TO RELATED APPLICATION(S)

None.

BACKGRUND OF THE INVENTION

The present invention relates generally to the field of magnetic data storage and retrieval systems. More particularly, the present invention relates to a transducing head having a perpendicular writer portion in which side writing is reduced significantly as compared to existing transducing head designs.

A transducing head of a magnetic data storage and retrieval system typically includes a writer portion for storing magnetically-encoded data on a magnetic medium and a reader portion for retrieving the magnetically-encoded data stored on the magnetic medium. The reader portion is positioned adjacent to the writer portion. The writer portion may be a perpendicular writer or a longitudinal writer. In either case, the general structure of the writer is similar, although the actual operation and dimensions of its elements will differ substantially. In a longitudinal writer, the poles are commonly referred to as a bottom pole and a top pole, whereas in a perpendicular writer, the poles are commonly referred to as a return pole (or the return poles) and a main pole. Longitudinal magnetic recording differs from perpendicular magnetic recording in that bits are written to a magnetic medium in a direction substantially parallel to a surface of the magnetic medium, rather than in a direction substantially normal to the surface of the medium. Perpendicular writers are utilized in order to obtain higher areal density. Perpendicular magnetic recording exhibits a minimum demagnetizing field at the bit boundary and thus a large number of perpendicularly oriented transitions can be packed into each lineal inch of the medium as compared to that of longitudinal magnetic recording.

A perpendicular writer is typically formed of a main pole, a back via, a return pole, a write gap, and one or more conductive coil layers. A main pole may also be known as a "write pole," and a return pole may also be known as an "auxiliary pole." The main pole and return pole are separated from each other at an air bearing surface (ABS) of the perpendicular writer portion by the write gap and are connected to each other at a region away from the ABS by the back via. The ABS is a surface of the transducing head immediately adjacent a magnetic medium. Positioned between the main pole and the return pole are the conductive coil layers encapsulated by insulating layers, which generally wrap around the back via. The main pole and return pole are both magnetic poles. The back via is formed of a magnetically conductive material. The write gap is generally a layer formed of nonmagnetic material. The main pole, return pole, and back via constitute a magnetic core of the writer portion.

The reader portion is typically formed of a bottom reader shield, a top reader shield and a magnetoresistive (MR) sensor positioned between the bottom and top reader shields. The top shield is the shield closest to the writer portion. Insulating layers are positioned between the MR sensor and the reader shields. The writer portion and reader portion are often arranged in a merged configuration in which a shared pole serves as both the top reader shield in the reader portion and a return pole in the writer portion.

A magnetic medium for perpendicular recording is generally formed of three layers: a medium layer having high perpendicular anisotropy, a nonmagnetic interlayer, and a soft magnetic underlayer (SUL) having high permeability. A perpendicular writer portion is positioned to write data in track on the magnetic medium, which is rotated at a high speed. The transducing head is supported over a surface of the magnetic medium by a thin cushion of air produced by the high rotation speed.

In order to write to the magnetic medium, a time-varying electrical current, also known as a write current, is caused to flow through the conductive coils layers of the perpendicular writer. The write current produces a time-varying magnetic field through the main and return poles. The main pole and return pole are generally opposite poles, thus the magnetic field flows from the main pole to the return pole. The magnetic medium is passed near the ABS of the transducing head at a predetermined distance such that a magnetic surface of the medium passes through the magnetic field. The main pole is the actual writing pole that actively magnetizes the adjacent bit areas on the magnetic medium, while the return pole completes a magnetic flux path from the main pole. The main pole is generally the trailing pole of the main and return poles. Accordingly, it is the main pole that defines the track width of the written data. More specifically, the track width is defined by the width of the main pole at the ABS.

The SUL of the magnetic medium essentially acts as a third pole of the writer, imaging the magnetic field emanating from the main pole. The magnetic field bridges the gap from the main pole to the SUL, passing through the medium layer, and then subsequently bridges the gap between the SUL and the return pole, again passing through the medium layer and completing a magnetic flux path. The latter portion is known as the return path. Data is written to the magnetic medium as the magnetic field, having a magnetic field value larger than the intrinsic magnetization of the magnetic medium, passes through the medium layer from the main pole. The magnetization in the magnetic medium is held in a direction substantially normal to the surface of the magnetic medium.

The return pole is substantially larger than the main pole at the ABS to help prevent the magnetic field from writing or erasing data on the return path. That is, the magnetic flux through the medium layer in the return path should not be concentrated sufficiently to overcome the intrinsic magnetization of the medium. By making the return pole substantially larger than the main pole at the ABS, the magnetic flux density in the return path is decreased.

The reader portion of the transducing head functions to retrieve magnetically-encoded data stored on a magnetic medium. When the transducing head is placed near the magnetic medium, a resistance of the MR sensor fluctuates in response to a magnetic field emanating from written transitions in the magnetic medium. That is, magnetic flux from the surface of the magnetic medium causes rotation of the magnetization vector of a sensing layer of the MR sensor, which in turn causes a change in electrical resistivity of the MR sensor. By providing a sense current through the MR sensor, the resistance of the sensor can be measured and used by external circuitry to decipher the information stored on the magnetic medium. The reader shields function to absorb any stray magnetic fields emanating from adjacent tracks on the magnetic medium so that the MR sensor will read only information stored directly beneath it on a specific track of the magnetic medium.

There is awareness in the art of the side track erasure problem. As a transducing head conducts a writing operation on a particular data track, it is desired that the transducing head does not affect data on an adjacent track. Side track erasure occurs if this condition is not met. In a primary sense, side track erasure may occur if the magnetic field at the pole tip of the main writing pole is not well defined and aligned to match the width of the data track. However, it is known in the art that side track erasure may also be caused by stray magnetic fields from other magnetic elements of the transducing head, such as a trailing edge of a return pole. The trailing edge of the return pole is the edge closest to the main pole. The large magnetic field generated at the trailing edge of a magnetic element is generally known as the erasure field. The erasure field may create a magnetic field adjacent to the bits, but outside the track in which the writing process is taking place. The erasure field can be large enough to erase or write over previously written tracks on the magnetic medium by destabilizing the medium magnetization configuration or write over the previously written tracks by reorienting the previously defined magnetization pattern. The erasure field activity is generally known as "side writing."

Perpendicular writers that reduce or minimize side writing are desirable. Thus, there is a need for a transducing head design which reduces side writing.

BRIEF SUMMARY OF THE INVENTION

The present invention is a transducing head having a main pole and at least one magnetic element (such as a return pole or reader shields) spaced from the main pole, which provides a potential return path for a magnetic field. The magnetic element is formed at least in part of a magnetic material having a magnetic property that reduces side writing at an edge of the magnetic element. A first embodiment of the present invention is a transducing head having at least one magnetic element which provides a potential return path for a magnetic field and is formed at least in part of a magnetic material having a saturation flux density lower than that of the magnetic material used to form the main pole by at least 0.5 Tesla. A second embodiment of the present invention is a transducing head having at least one magnetic element which provides a potential return path for a magnetic field and is formed at least in part of a magnetic material having a coercivity in a range of about 10 Oersteds to about 1000 Oersteds.

DETAILED DESCRIPTION

The present invention recognizes that side writing at a trailing edge of a magnetic element of a transducing head is reduced by changing and optimizing at least one magnetic property of magnetic material forming at least part of the magnetic element. The magnetic element is any element of the transducing head that provides a potential return path for a magnetic field produced by the main pole, and may be a shared pole, or in the case that a transducing head is not arranged in a merged configuration, the magnetic element may be a return pole or reader shield. Performance of a main pole of the perpendicular writer is not substantially affected by modifying the magnetic material forming the magnetic element. In a first embodiment, the magnetic element may be formed from a low moment magnetic material having saturation flux density $B_S$ much lower than that of the high moment material used to form the main writing pole. In a separate second embodiment, the magnetic element may be formed from a magnetic material having a coercivity in a range of about 10 Oersteds (Oe) to about 1000 Oe. The concept of the present invention may be applied in any perpendicular writer having a main pole and a return pole, as exemplified herein in detail, without any suggestion of limiting or restricting of the application of the present invention to the particular types of perpendicular writers illustrated in the examples.

In the present invention, the term "main pole," "top pole," and "write pole" are used interchangeably to refer to a part of a perpendicular writer which actually writes on a magnetic medium as illustrated herein. The term "auxiliary pole" and "return pole" are used to refer to the magnetic pole opposing the main pole and forming a part of magnetic flux path as illustrated herein. The two terms are used interchangeably herein, despite the awareness of a possible subtle different usage in the art in which the term "return pole" may strictly refer to a magnetic pole that is the opposite of the pole in which the magnetic excitation occurs regardless of which pole is the main pole and which pole is the auxiliary pole.

Figure 1:
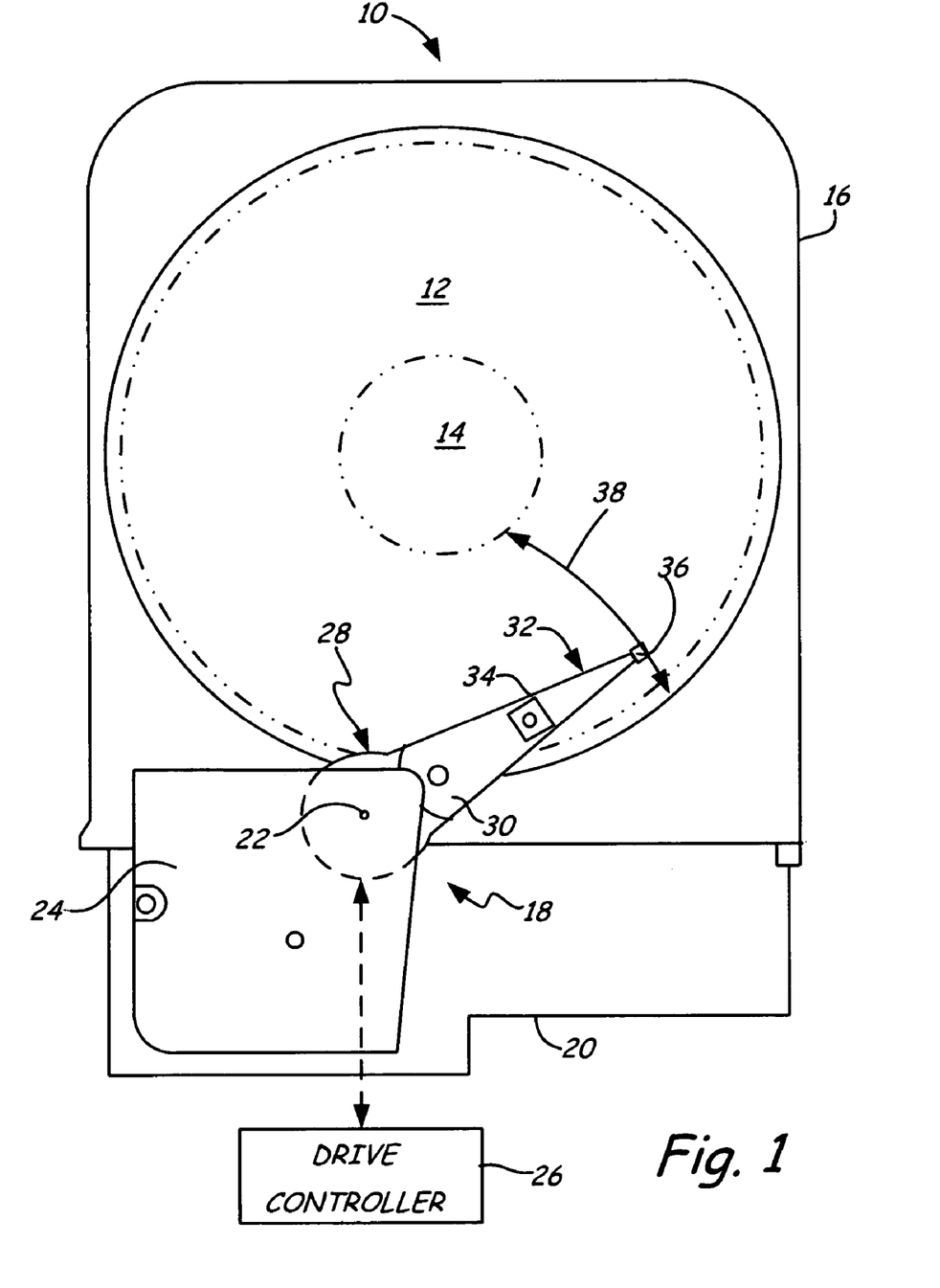
FIG. 1 is a top view of typical disc drive system employing a transducing head having a perpendicular writer portion and a reader portion.

FIG. 1 is a top view of typical disc drive system 10 employing a transducing head having a perpendicular writer and reader portion. Disc drive system 10 includes magnetic medium 12 mounted for rotational movement about an axis defined by spindle 14 within housing 16. Disc drive system 10 also includes actuator 18 mounted to base plate 20 of housing 16, with actuator 18 being pivotally movable relative to disc 14 about axis 22. Cover 24 covers a portion of actuator 18. Drive controller 26 is coupled to actuator 18. Drive controller 26 is either mountable within disc drive system 10 or is located outside of disc drive system 10 with suitable connection to actuator 18. Actuator 18 includes e-block assembly 28, actuator arm 30 and head suspension assembly 32. Head suspension assembly 32 includes load beam 34 coupled to actuator arm 30 and air bearing slider 36 coupled to load beam 34 by a flexure. Slider 36 carries a transducing head, which has a reader portion, such as an MR head, for reading information from disc 12 and a perpendicular writer for encoding data on disc 12.

During operation, drive controller 26 receives position information indicating a location on disc 12 to be accessed. Based on the position information, drive controller provides a position signal to actuator 18, which causes actuator 18 to pivot about axis 22. The movement causes slider 36 to move radially over the surface of disc 12 in a path indicated by arrow 38. Drive controller 26 and actuator 18 operate in a known manner so that the transducer carried by slider 36 is positioned over the desired location of disc 12. Once the transducer is properly positioned, the transducing head performs a desired read or write operation.

Figure 2:
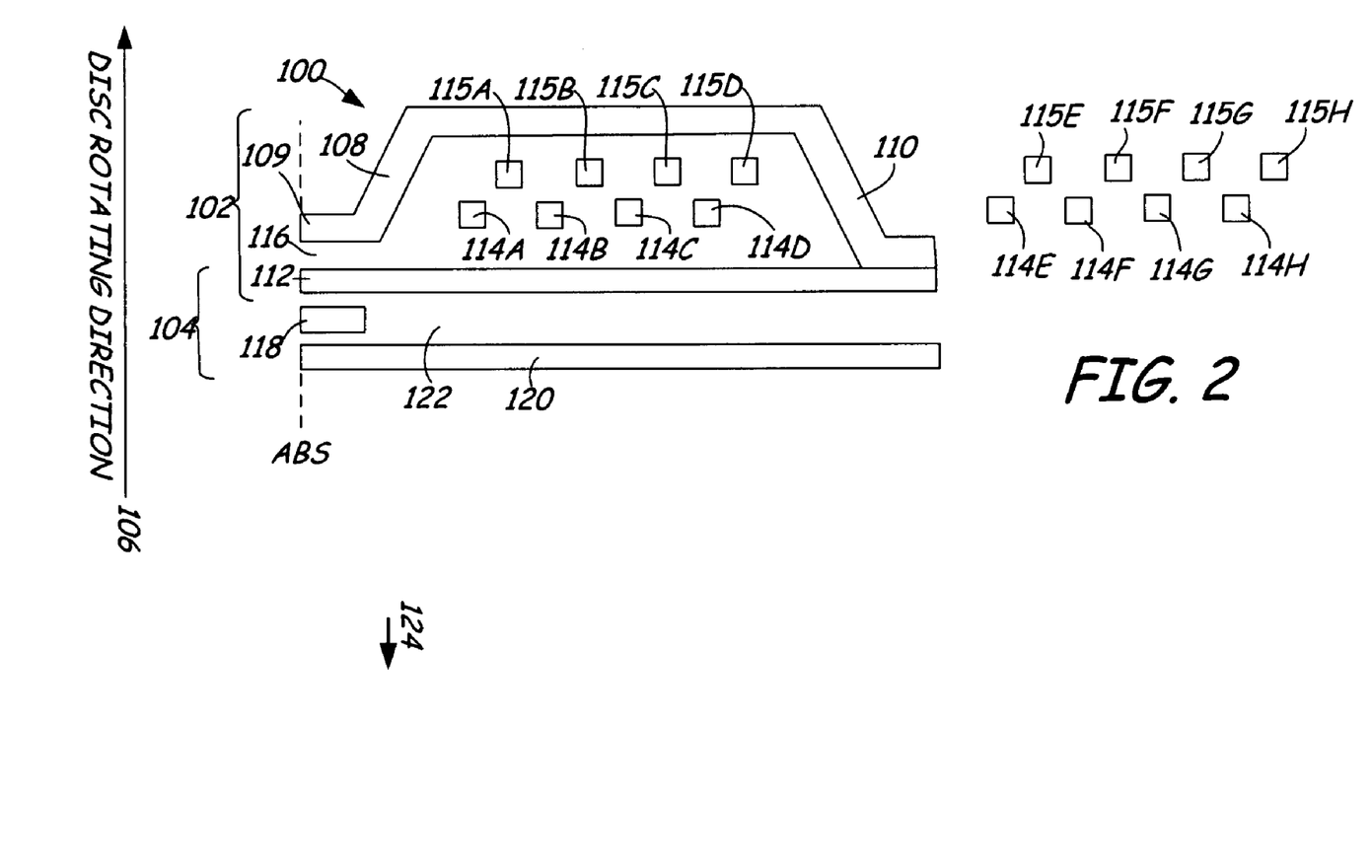
FIG. 2 is a cross-sectional view of a transducing head having a perpendicular writer portion and a reader portion in accord with the present invention.
Figure 3:
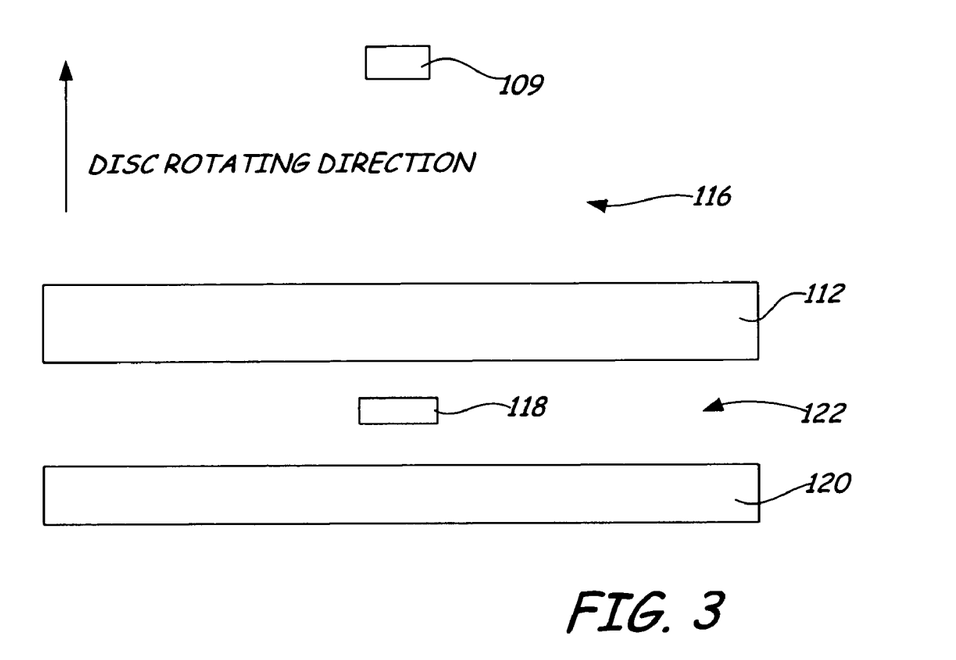
FIG. 3 is a schematic illustration of the transducing head of FIG. 2 as viewed from the air bearing surface (ABS).

FIG. 2 is a cross-sectional view of transducing head 100 having perpendicular writer portion 102 and reader portion 104, which are typically carried by a slider such as slider 36 described in FIG. 1. Arrow 106 indicates the direction of movement of a magnetic medium (not shown). FIG. 3 is a schematic illustration of transducing head 100 as viewed from the air bearing surface (ABS). The ABS of transducing head 100 is the surface immediate adjacent a magnetic medium (not shown).

Writer portion 102 of transducing head 100 comprises top pole 108 (including top front pole portion 109), back via 110, shared pole 112, first pancake coil layer 114 (shown in cross-section as inner coils 114A–114D and outer coils 114E–114H), second pancake coil layer 115 (shown in cross section as inner coils 115A–15D and outer coils 115E–15H) and write gap 116. Top pole 108 and shared pole 112 are the main pole and the return pole for transducing head 100, respectively. Thus, top pole 108 will be referred to as a main pole. Shared pole 112 is also known as bottom pole 112. In a thin-film perpendicular writer, magnetic poles are typically fabricated sequentially in the bottom-to-top order and are therefore referred to as bottom pole 112 and top pole 108 accordingly. Generally, main pole 108, shared pole 112 and connecting materials, such as back via 110, are made of magnetic materials, and these parts together constitute a magnetic core of writer portion 102 of transducing head 100.

Reader portion 104 comprises shared pole 112, read element 118, bottom shield 120, and read gap 122. Read element 118 is positioned between shared pole 112 and bottom shield 120 adjacent the ABS of transducing head 100. Shared pole 112 acts as a top shield for reader portion 104 and as a bottom pole for writer portion 102. Read gap 122 serves to isolate read element 118 from both shared pole 112 and bottom shield 120. Read element 118 may be an MR sensor, a multilayer device operable to sense magnetic fields from the magnetic medium. Read element 118 may be any one of a plurality of MR-type sensors, including, but not limited to, AMR (anisotropic magnetoresistive), GMR (giant magnetoresistive), TMR (tunnel magnetoresistive), and spin valve. At least one layer of read element 118 is a sensing layer, such as a free layer of a GMR spin valve sensor that requires longitudinal biasing. Bottom shield 120 is formed of magnetic material, and may be formed of the same material as shared pole 112, but it is not necessary to the operation of transducing head 100.

The present invention optimizes parameters of a magnetic material forming at least part of a magnetic element of a transducing head that provides a potential return path for a magnetic field produced by the main pole in order to reduce side writing. The premise and utilities of this inventive concept are discussed in detail in later parts of this description after the structural aspects related to the present invention have been presented and discussed. For the purpose of illustration with regard to the specific embodiment shown in FIG. 1 and FIG. 2, however, it suffices to assume at this point that shared pole 112, which functions as the return pole of writer portion 102 and the top shield of reader portion 104, is formed at least in part from the magnetic material having the magnetic property that reduces side writing at shared pole 112. Bottom shield 120 may be formed at least in part of the magnetic material as shared pole 112, or may be formed of permalloy.

Inner coils 114A–114D and 115A–115D are located between main pole 108 and shared pole 112. Shared pole 112 is relatively planar in shape, while main pole 108 is bump-shaped due to the existence of coil layers 114 and 115, where the bump is defined by the layering of the inner coils between main pole 108 and shared pole 112. At the ABS of transducing head 100, main pole 108 is separated from shared pole 112 by write gap 116, which is typically filled with an insulation layer. At a region of transducing head 100 distal from the ABS, main pole 108 is in direct contact with shared pole 112 at back via 110. Main pole 108 has a tip portion 109, which is tapered at the ABS to define a track width of the data written to the magnetic medium.

First pancake coil layer 114 is one continuous coil which wraps around back via 110 in a plane substantially normal to both the ABS of transducing head 100 and to the plane of the paper in FIG. 1. In one type of first pancake coil layer 114, the coils may be wrapped in the following order: 114D to 114E to 114C to 114F to 114B to 114G to 114A to 114H. Similarly, second pancake coil layer 115 is a single continuous coil which wraps around back via 110 in a plane substantially normal to both the ABS of transducing head 100 and to the plane of the paper in FIG. 1. In one type of second pancake coil layer 115, the coils may be wrapped in the following order: 115D to 115E to 116C to 115F to 115B to 115G to 115A to 115H. To form a single coil, rather than two coils, coil 114D may be connected to coil 115D. In this configuration of the coils, coils 114H and 115H serve as contacts to which current may be provided to the single continuous coil. Each of the individual coils 114A–114H and 115A–115H are separated from one another and from main and shared poles 108 and 112 by an insulating material.

To write magnetically-encoded data to the magnetic medium, an electrical current, also known as a write current, is caused to flow through coil layers 114 and 115, thereby inducing a magnetic field across write gap 116 between main pole 108 (specifically main front pole 109) and shared pole 112. This process is called magnetic excitation. Transducing heads having perpendicular writer portions fall roughly into two groups with respect to the type of magnetic excitation utilized, one group being the auxiliary pole excitation type in which the conductive coils induce magnetic fields in the auxiliary pole, while the second group being the main pole excitation type in which the conductive coils induce magnetic fields in the main pole. For various reasons, the main pole excitation type as illustrated in FIG. 2 has gained popularity in newer perpendicular writers. The auxiliary pole is often referred to as the return pole because in a main pole excitation type perpendicular writer, the magnetic flux is induced in the main pole, fringes across the write gap at the ABS between the main pole and auxiliary pole and returns to the auxiliary pole to complete the magnetic flux path. In the present description, the terms "auxiliary pole" and "return pole" are used interchangeably regardless of the excitation type of the perpendicular writer.

As the magnetic fields are excited, the induced fringing magnetic flux travels through the adjacent magnetic medium and writes bits of magnetic field information in magnetic bit areas on the moving magnetic medium, such as circular data tracks on a rotating magnetic disc. By reversing the polarity of the current through the coils, the polarity of the data written to the magnetic medium is also reversed.

Main pole 108 is generally the trailing pole of the main and shared poles 108 and 112 during the traversing between the head and magnetic medium, and thus has the "final word". Main pole 108 is the actual writing pole that actively magnetizes the adjacent bit areas on the magnetic medium while shared pole 112 is to complete a magnetic flux path from the magnetic core. This helps to avoid the written data from being accidentally erased by a subsequent trailing magnetic component. Accordingly, it is main pole 108 that defines the track width of the written data. More specifically, the track width is defined by the width of main pole 108 at the ABS.

At the same time, writer portion 102 of head 100 is so designed that the magnetic flux density near the tip of shared pole 112 is substantially less than that near the tip of the top pole, main pole 108. This ensures that only main pole 108, rather than shared pole 112, exerts enough magnetic coercive force to magnetize the adjacent magnetic medium. The most common way to achieve this designed property is to let shared pole 112 have a cross-sectional area ("thickness") much larger than that of main pole 108. The thickness is measured in the cross-section parallel to the ABS at the tip of the poles in a direction along the direction of relative movement of transducing head 100, which is indicated by arrow 124. Because main pole 108 and shared pole 112 complete the same magnetic flux return path for roughly the same amount of magnetic flux, thicker cross-section of shared pole 112 translates to a relatively lower flux density at shared pole 112.

Figure 4:
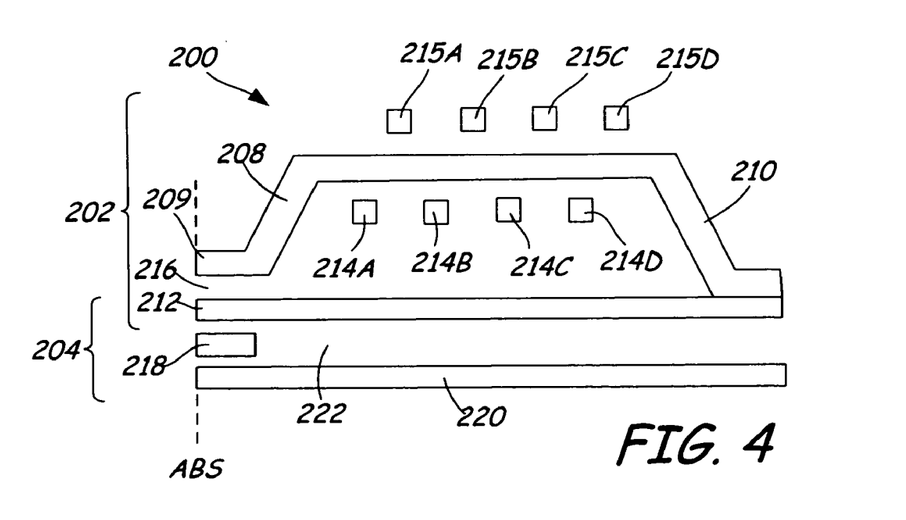
FIG. 4 is a cross-sectional view of a second exemplary transducing head in which the present invention is embodied

The configuration of conductive coils is not essential for the present invention. Any coil configuration effective for the purpose of magnetic excitation may be used in combination with the present invention. For example, FIG. 4 is a cross-sectional view of transducing head 200, which is a slight variation of the transducing head 100 in FIG. 1. In transducing head 200, writer portion 202 includes main pole 208, back via 210, shared pole 212, bottom coil layer 214 (shown in cross-section as coils 214A–214 D), top coil layer 215 (shown in cross-section as coils 215A–215D), and write gap 216. Bottom coil layer 214 is positioned between main pole 208 and shared pole 212, while top coil layer 215 is positioned on a side of main pole 208 opposite bottom coil layer 214. Bottom coil layer 214 and top coil layer 215 are joined together to form one continuously wound solenoidal coil which wraps around main pole 208 in a plane substantially normal to the plane of the paper of FIG. 4. In one type of bottom and top coil layers 214 and 215, the solenoidal coil is wrapped in the following order: 214A to 215A to 214B to 215B to 214C to 215C to 214D to 215D, wherein coils 214A and 215D serve as contacts to which current may be provided through the solenoidal coil. The vertical coil configuration as shown in FIG. 4 may offer improved efficiency over the pancake coil configuration, in that a greater percentage of the main pole is wrapped by the coils, and thus requires fewer number of coil turns around the main pole. Additionally, the configuration allows for a shorter length of coil per coil turn. The shorter overall length of the vertical coil configuration thus offers improved frequency response over the pancake coil configuration.

Although coil configuration is described with reference to different parts of the magnetic core of the perpendicular writer, it is not to be used as a way to define these parts (e.g., main pole, return pole and back via). For example, in transducing head 100 in FIG. 2, coils are wrapped around back via 110, while in transducing head 200 in FIG. 4, coils are wrapped around main pole 208. At least in principle, there is no reason that coils cannot be wrapped around the return pole such as shared pole 112 or 212 in FIG. 2 or FIG. 4, respectively. The main pole and the return pole of the perpendicular writer are defined by their respective functionality. The return pole is differentiated from the main pole in that the fringing magnetic field at the return pole is much weaker than that at the main pole so that only the main pole performs the actual writing function. On the other hand, the return pole is differentiated from just another magnetic layer that happens to exist in the magnetic core in that a majority (rather than only an arbitrarily small portion) of the magnetic flux comes from the main pole returns to, and is close by, the return pole. Ideally, substantially all the magnetic flux from the main pole should return to the return pole to form a mostly closed magnetic flux path.

Figure 5:
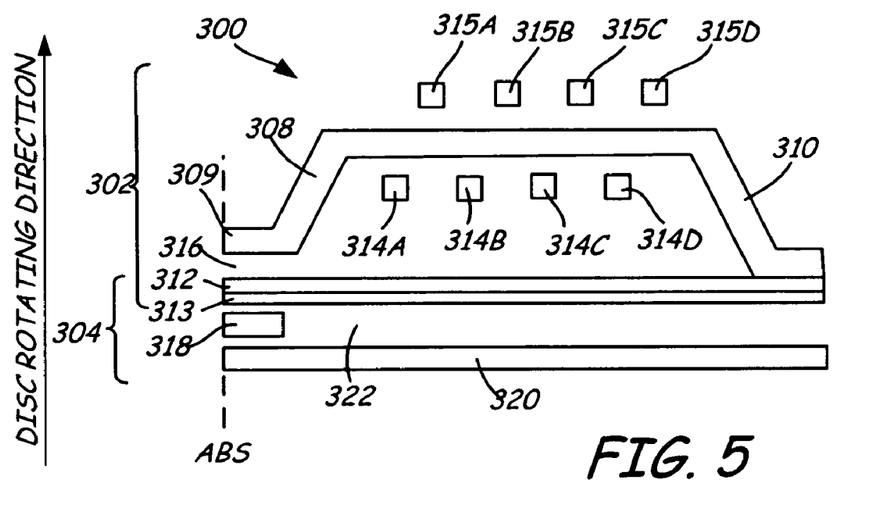
FIG. 5 is a cross-sectional view of a third exemplary transducing head in which the present invention is embodied.

Writer portion 102 and reader portion 104 as shown in FIG. 2 and writer portion 202 and reader portion 204 as shown in FIG. 4 are arranged in a merged configuration in which a shared pole serves as both the top shield of the reader portion and the bottom pole of the writer portion. Alternatively, as shown in FIG. 5, writer portion 302 and reader portion 304 can be arranged in a piggyback configuration in which bottom pole 312 (also known as return pole 312) of writer portion 302 and top shield 313 of reader portion 304 are two different layers but are combined together. The remaining elements of transducing head 300 are like-numbered with FIGS. 2 and 4, and provide substantially the same function.

Figure 6:
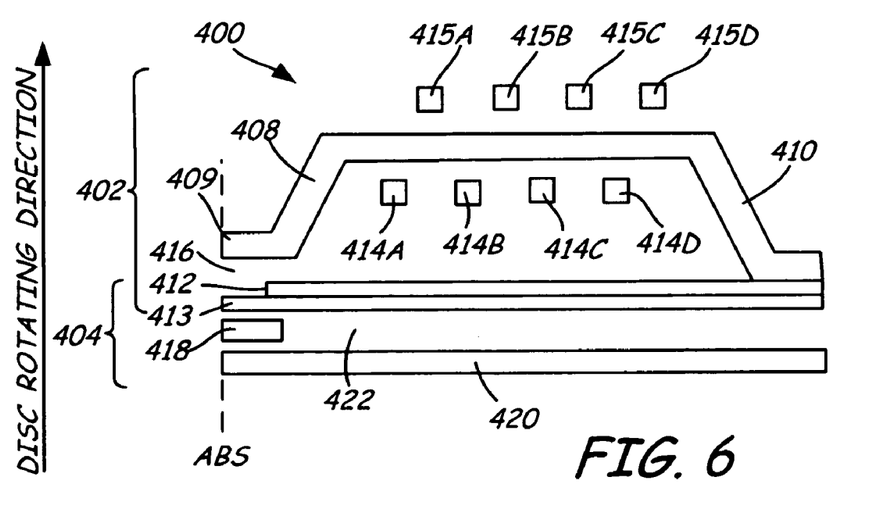
FIG. 6 is a cross-sectional view of a fourth exemplary transducing head in which the present invention is embodied.

FIG. 6 is yet another variation of a transducing head which may incorporate the present invention. Transducing head 400 is essentially the same as transducing head 300 in FIG. 5, except that the end of return pole 412, which is facing the ABS is slightly recessed from the ABS as compared to top shield 413. In this design, return pole 412 may or may not be formed at least in part from a magnetic material having a magnetic property that reduces side writing at return pole 412. When desirable, either or both return pole 412 and top shield 413, or a portion thereof, may be formed at least in part of the magnetic material having the magnetic property that reduces side writing at return pole 412 or top shield 413. A particular consideration in the embodiment according to FIG. 6 is that, although it is the fringing field at top shield 413 that is more likely to cause side writing, this fringing field is nevertheless dependent upon the magnetic properties of material used for return pole 412, as well as that of top shield 413. In addition, the present invention may also be applied in the so-called "inverted configuration" found in U.S. Pat. Nos. 6,122,144 and 6,278,591 in which the reader portion is connected to the writer portion at a side close to the main pole of the writer portion rather than that of the return pole. The present invention may also be applied in the so-called "cusp configuration" of a transducing head in which the main pole is positioned between two return poles.

One known reason for side writing is stray magnetic fields crowding at a trailing edge of a magnetic element of a transducing head during the return path. The magnetic element referred to is any element of the transducing head providing a potential return path for a magnetic field produced by a main pole of the transducing head. The trailing edge of the magnetic element is the edge closest to a main pole of the transducing head. Thus, side writing caused by a magnetic element can be reduced by reducing the crowding of the magnetic field at the trailing edge of the magnetic element. The present invention recognizes that optimizing a magnetic property of a magnetic material forming at least part of the magnetic element can help reduce side writing by reducing the crowding of the magnetic field at the trailing edge of the magnetic element. The magnetic element may be formed in whole or in part (such as a portion forming the trailing edge of the magnetic element or a portion forming the ABS of the magnetic element) of the magnetic material.

In the first embodiment of the present invention, the magnetic element is formed from magnetic material having a low moment and saturation flux density $B_S$ much lower than a relatively higher moment material used to form the main pole in order to reduce a fringing magnetic field near a return pole, and thus reduce side writing. In the second embodiment, which is to be applied separate from the first embodiment, coercivity $H_C$ of the magnetic material is modified in order to pin the magnetic field crowding at the trailing edge of the magnetic element, making it more difficult for the magnetic field to rotate towards a magnetic medium as compared to prior art magnetic elements, and thereby reducing side writing. More specifically, $H_C$ is in a range of about 10 Oe to about 1000 Oe and permeability $\mu$ is greater than 50.

Although erasure fields from the magnetic element may be somewhat weak, a magnetization decay process of a magnetic medium can still be triggered and occur faster, leading to a non-negligible threat to the long term thermal decay problem in perpendicular recording. Magnetization decay refers to the decay process of the magnetic medium when side writing occurs. In addition, the presence of the erasure fields generated by the return pole or the read shield can strongly affect the recording data retention and may increase the media noise level.

As bit area and track width become smaller, stability and reliability of the magnetic data bits becomes an issue. To maintain the reliability at high recording densities, materials having high magnetic anisotropy are used for the magnetic recording medium in order to increase the coercivity $H_C$ of the recording medium and to accordingly increase the stability and reliability thereof. Accordingly, the saturation magnetic flux density $B_S$ of the writer core is required to be higher in order to be able to write on such high coercivity magnetic recording medium through magnetizing the bit areas thereon. The term "writer core" is used to refer to a writer portion of a transducing head, such as 102 or 202 in FIGS. 2 or 4, respectively. $B_S$ of a magnetic material is the maximum magnetic field that the material can support for any current applied on the material to induce magnetic field. The value of $B_S$ of a magnetic material is found at the maximum point of the material's hysteresis curve, beyond which point additional current will not increase the value of the magnetic field. Because the saturation point is where virtually all individual magnetic moments in the material have been aligned in the same direction by the magnetic field, the $B_S$ of the material is directly related to the magnetic moments of the material. For this reason, $B_S$ is often considered synonymous with magnetic moment. For example, a material having a high saturation magnetic flux density is often synonymously called a high magnetic moment material.

To more effectively induce magnetic flux density, the material for making the magnetic core of the perpendicular writer generally also has high magnetic permeability. For materials having high $B_S$, such as ferromagnetic materials, magnetic permeability is usually not a constant. However, when used as a generic term to represent the ratio of the magnetic flux density to the magnetic field, higher magnetic permeability generally means that for a given magnetic field, more magnetic flux may pass through the magnetic material. In addition, to reduce magnetic loss caused by the eddy current in the high frequency bands, the magnetic material used for the writer core is required to have high electric resistivity. Because the commonly used permalloys have a $B_S$ in the range of 1.0–1.5 Tesla only, and many have relatively low resistivity, much effort has been made in the art to make new materials that have high $B_S$ and high resistivity. Examples of such efforts are found in U.S. Pat. No. 6,490,131. In order to achieve a $B_S > 1.5$ Tesla for the writer core material, that patent suggested an electroplated thin-film made of Ni—Fe alloy of which Ni is 30% to 60% (by weight) and Fe is 40% to 60%.

A first embodiment of the present invention uses a low moment magnetic material to form a part of the magnetic core of the perpendicular writer in order to reduce side writing. Preferably, magnetic element which may provide a potential rerun path for a magnetic field produced by a main pole is formed at least in part of a magnetic material having a $B_S$ that is lower than that of a magnetic material used to form at least part of a main pole by at least 0.5 Tesla. For example, using FIG. 2, shared pole 112 (the return pole) is formed at least in part from magnetic material having $B_S$ that is lower than that of the magnetic material used to form top front pole 109 of main pole 108 by at least 0.5 Tesla. As illustrated herein, it is found that the use of the low moment magnetic material to form the return pole (e.g. shared pole 112 in FIG. 2) of the writer reduces the fringing magnetic field near the return pole and thus reduces the likelihood to cause side writing. Surprisingly, as also illustrated herein, the use of the low moment magnetic material to form the return pole does not substantially affect the magnetic field profile near the main pole (e.g. top front pole 109 of main pole 108 in FIG. 2).

The effect of magnetic moment of the magnetic material forming a shared pole, such as shared pole 112, on the fringing field near the shared pole was studied using a finite element model (FEM) simulation in a design of experiment approach in which several variables were allowed to be varied. The FEM simulation results were analyzed, yielding a set of regression equations that acted as transfer functions for fringing field as functions of the several variables. It was found that the moment of the shared pole had the largest effect on the fringing magnetic field near the shared pole, yet surprisingly did not result in substantial reductions of the magnetic field near top front pole, such as top front pole 109. The FEM simulation results are illustrated in FIGS. 7 and 8.

Figure 7:
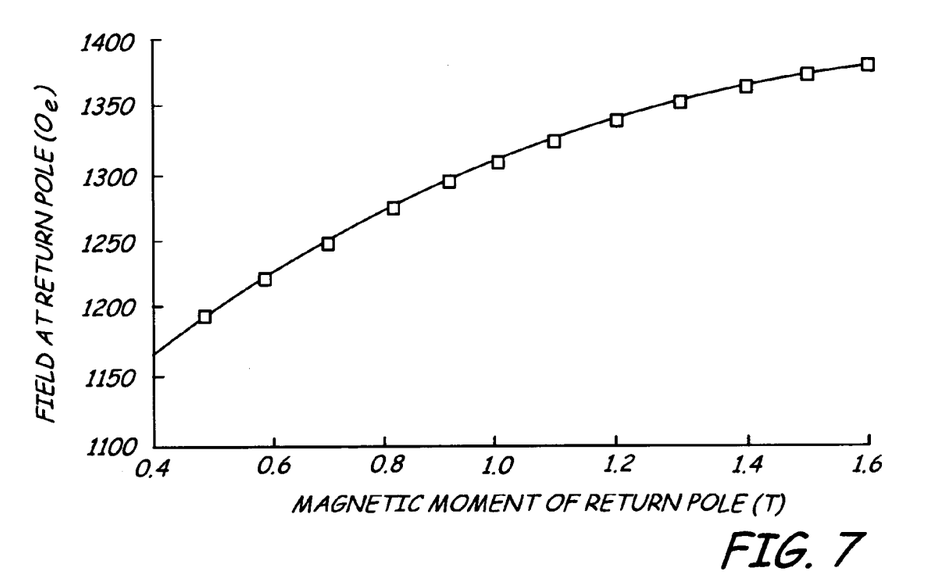
FIG. 7 is a graph showing the relationship between a fringing field at a return pole and a magnetic moment of a material used for forming a return pole.

FIG. 7 is a graph showing the relationship between a fringing field at a return pole (e.g. shared pole 112 in FIG. 2 or return pole 312 in FIG. 5) and the magnetic moment of the material used for forming the return pole. As shown in FIG. 7, as the magnetic moment of the material for the return pole decreases from 1.6 Tesla to 0.4 Tesla, the fringing field at the return pole decreases from about 1380 Oe to about 1160 Oe, representing approximately a drop of 220 Oe. A drop of the fringing field at the return pole of this magnitude is expected to have a significant effect on reducing the potential of causing side writing by the return pole. In the above simulation results, the relative drop of the fringing field is more meaningful than the actual fringing field simulated at various values of the magnetic moment of the material forming the return pole, because the latter vary quite significantly according to the specific design of the writer including the geometric design such as the flare point, while the former, although also varies to a certain degree, represents a clear improvement in terms of reducing the potential to cause side writing.

Figure 8:
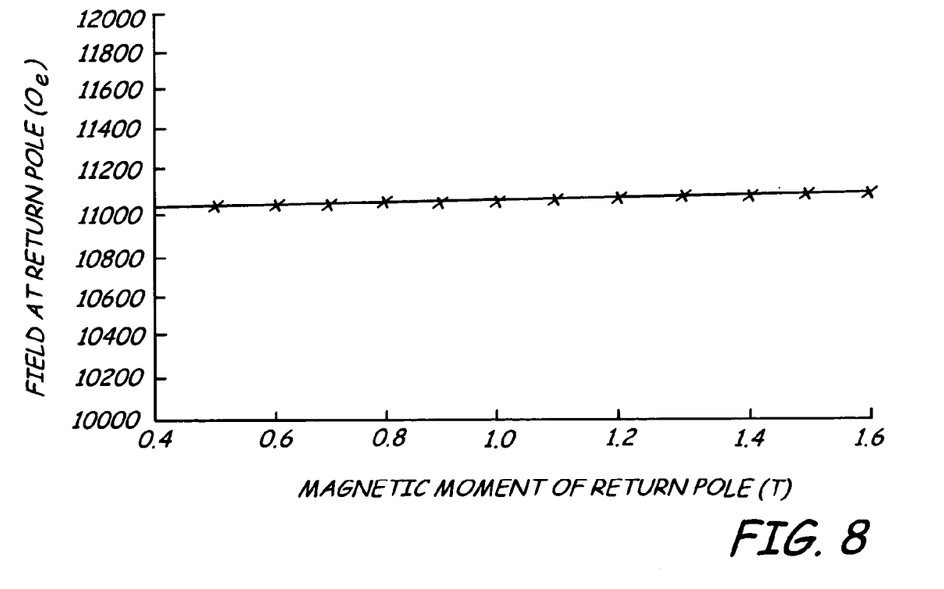
FIG. 8 is a graph showing the relationship between a field at a main pole and a magnetic moment of a material for forming the return pole.

FIG. 8 is a graph showing the relationship between a field at a main pole (e.g. top front pole 109 in FIG. 2 and top front pole 209 in FIG. 4) and a magnetic moment of a material for forming a return pole. As shown in FIG. 8, as the magnetic moment of the material for the return pole decreases from 1.6 Tesla to 0.4 Tesla, the field at the main pole remains roughly unchanged, decreasing only slightly from about 11,145 Oe to about 11,065 Oe, representing a change of less than 1%. A drop of the field at the main pole of this small magnitude is expected to have no significant effect on the magnetic field profile of the main pole and thus no detrimental effect on the writing performance of the writer.

In another embodiment, instead of making an entire return pole (e.g., shared pole 112 of FIG. 2 or return pole 312 of FIG. 5) using the low moment material, only a front portion of the return pole close to the ABS needs to use the low moment material. Although this may seem to complicate the process of fabrication, there may be other competing factors that make this type of design favorable. The choice may be made based on an optimization among the factors including overall magnetic conductance of the magnetic core, magnetic excitation efficiency, the drop of fringing field at the return pole and the change of the writing field at the main pole.

Preferably, sub-1T magnetic materials are used as the low moment magnetic material used to form at least part of a magnetic core of a perpendicular writer in order to reduce side writing. Sub-1T magnetic materials (i.e., magnetic material having a moment lower than one Tesla) in accordance with the present invention may be obtained using a number of available techniques, including but not limited to electroplating with a composition of NiFeX, where X=Cu, P, B, O, or S. Low moment materials thus made may also possess desirable properties such as high permeability.

The second embodiment of the present invention recognizes that a perpendicular magnetization gradient at a trailing edge of a magnetic element contributes to a crowding of a magnetic field at the trailing edge of the magnetic element, where a magnetic moment discontinuity occurs. Thus, the second embodiment pins the magnetization and stabilizes the magnetic moment in the magnetic element such that the magnetization does not rotate as freely in the presence of an external field as compared to prior art magnetic elements. Magnetization and magnetic moment are used interchangeably in the discussion of the second embodiment of the present invention.

Prior art magnetic elements that provide a potential rerun path for a magnetic field produced by a main pole, such as a return pole or a reader shield, use a material having $H_C$ in a range of about two Oe to about seven Oe and a permeability greater than 50, such as permalloy. Ideally, the magnetization of the easy axis of the material forming the magnetic element is parallel to the surface of the magnetic medium, so as not to be directed towards the magnetic medium. However, in a magnetic element formed of magnetic material having $H_C$ in a range of about two Oe to about seven Oe, a small external magnetic field may cause the magnetic moment at the trailing edge of the magnetic element to shift in a direction perpendicular to the magnetic medium, which may cause side writing. The magnetic moment may shift at the trailing edge of the magnetic element because there is generally partial saturation at the trailing edge of the magnetic element and so, when an external field changes polarity, the magnetization at the trailing edge will change.

$H_C$ is a measure of the magnetic field at which a magnetization will change direction. If a first magnetic material A has lower $H_C$ than a second magnetic material B, then a magnetization of first material A will change direction at a lower external magnetic field than a magnetization of second material B. In magnetic elements formed at least in part of low $H_C$ materials, that is, $H_C$ in a range of about two Oe to about seven Oe, local magnetization at an edge of the magnetic element may rotate freely, reorient in the presence of a relatively small magnetic field, and generate a magnetic field towards the magnetic medium. The magnetic field may then reverse any magnetization in the magnetic medium previously written, if it is sufficiently concentrated to overcome the intrinsic magnetization of the magnetic medium. That is, low $H_C$ contributes to side writing by causing any small local magnetic fluctuations or stray field variations to cause significant local magnetization reorientation in the magnetic element.

The present invention, however, addresses the side writing problem by stabilizing the magnetic moment of a magnetic element by utilizing a high $H_C$, high permeability magnetic material for at least part of a magnetic element that provides a potential return path for a magnetic field produced by a main pole. That is, a return pole, shared pole, top shield and/or a bottom shield of a transducing head can be formed at least in part of the high $H_C$ material. "High" $H_C$ is preferably an $H_C$ in a range of about 10 Oe to about 1000 Oe. "High" permeability is preferably a permeability 50 or higher. When the material forming the magnetic element has a coercivity in the range of 10 Oe to about 1000 Oe, small external magnetic fields will not rotate the magnetic moment of the magnetic element in a direction perpendicular to the surface of the magnetic medium.

FIG. 2 is used to aid the reader in understanding the second embodiment of the present invention, but the high $H_C$, high permeability material can be used with any transducing head configurations, including the configurations shown in FIGS. 4, 5, 6, and 9. The present invention recognizes that a high $H_C$ material, preferably in a range of about 10 Oe to about 1000 Oe, pins a magnetic field in a magnetic element, such as shared pole 112 and bottom shield 120 such that the magnetic field at an edge of the magnetic element does not rotate as easily as in prior art materials and generate a large magnetic field towards a magnetic medium, thereby reducing side writing. High $H_C$ of the material pins the magnetic field because $H_C$ is a measure a magnetization field required to rotate half the magnetization of a material such that the net flux within the material is zero. $H_C$ greater than 1000 Oe may cause the material to become too hard, which will result in inefficient writing, because a hard material cannot conduct flux as easily as a soft material.

Permeability is a measure of the ability of a material to acquire high magnetization in a relatively weak magnetic field. A material with a low permeability would not acquire magnetization in relatively weak magnetic fields and would not be able to conduct flux as easily as a material having a high permeability. It is essential for shared pole 112 and bottom shield 120 to conduct flux away from the magnetic medium in order to complete a magnetic flux path and maintain efficient writing. Thus, permeability of the material should remain higher than 50 in order to retain properties of a soft magnetic material in order to conduct flux efficiently to maintain writability and to absorb stray field associated noises. The permeability value is measured prior to magnetic saturation of the material. Moreover, it is generally preferred that the high $H_C$ magnetic material have a hard axis saturation field $H_S$ greater than 1000 Oe and a hard axis anisotropy field $H_K$ is in a range of about 10 Oe to about 1000 Oe.

High $H_C$ material may be deposited using electrodeposition or plating techniques known in the art. Suitable alloy materials contain Fe or Co, or FeCo alloys and may also contain transition metals, transition metal oxides, metalloids or oxides of metalloids. Examples of high $H_C$, high permeability material that may be used include, but are not limited to, CoFeHf, FeAlO, CoFeB, CoZrNb, CoAlPtO, FeCoNi, FeCoZrO, FeSiNi, NiFeNb, FeSi, CoZrO, and FeCoSi.

The transducing heads shown in FIGS. 2, 4, 5 and 6 all have a hill which is thinner near the air bearing surface than it is toward the center of the writer. The shape of the top pole, which is formed on this hill, follows the contour of the hill which results in top pole having a bump shape. As described above, the track width of the written data is defined by the width of the top pole at the ABS. However, with top pole being sloped near the ABS, it may be difficult to precisely control the width of the top pole at the air bearing surface, particularly as the width necessarily becomes smaller to allow for greater data storage densities. This is particularly important in perpendicular recording devices designed to operate with extremely high data storage densities and small track widths. To address these concerns, an alternative perpendicular writer that can incorporate the present invention is discussed with reference to FIG. 9.

Figure 9:
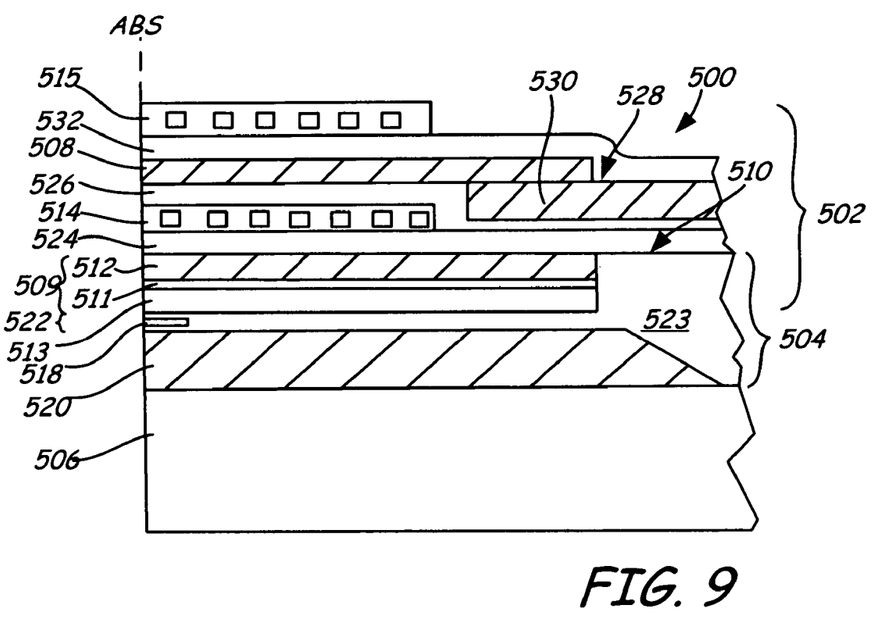
FIG. 9 is a cross-sectional view of a fifth exemplary transducing head in which the present invention is embodied.
Figure 10:
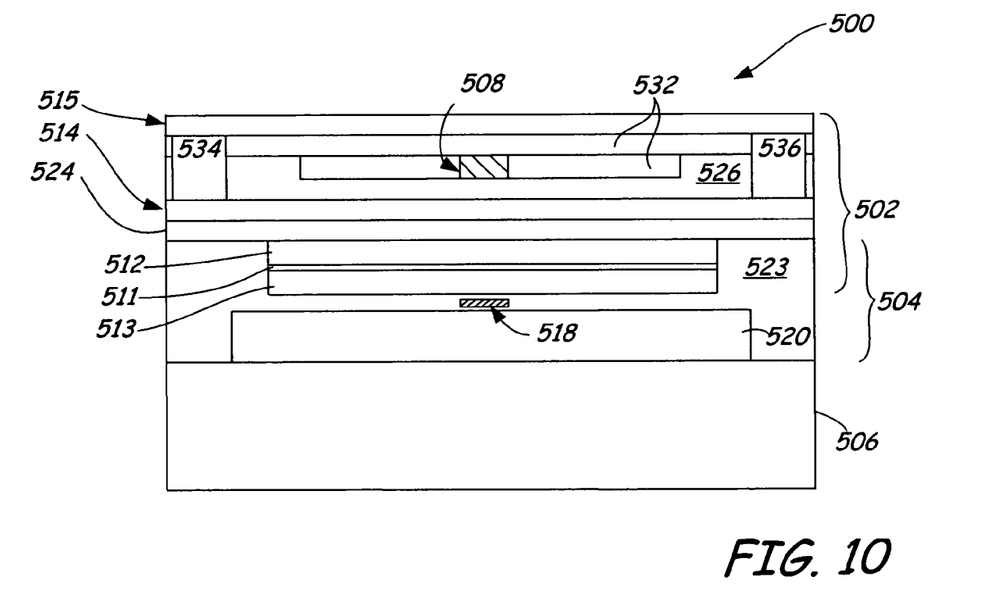
FIG. 10 is a cross-sectional view showing the structure of the transducing head from FIG. 9 as viewed from the ABS.

FIG. 9 is a cross-sectional view of an alternative transducing head 500 which may incorporate the present invention. FIG. 10 is a cross-sectional view showing the structure of transducing head 500 as viewed from the ABS. Transducing head 500 includes both perpendicular writer portion 502 and reader portion 504 formed on substrate 506. Writer portion 502 includes: bottom pole 512, which in combination with top shield 513 and optional spacer layer 511 forms shared pole 509, having a planar surface 510, at the top surfaces thereof; first insulation layer 524; first coil layer 514; second insulation layer 526 having planar surface 528 at the top surface thereof; top pole 508; yoke 530 formed in a flanking region of top pole 508; third insulation layer 532; and second coil layer 515. Yoke 530 is made of a magnetic material and is much wider in the direction perpendicular to the paper of FIG. 9. One of the functions of yoke 530 is to support top pole 508 which is required to be very thin in a region close to the ABS. Yoke 530 as shown in FIG. 9 is formed underneath top pole 508. However, it may also be formed on one or both lateral sides (along the direction perpendicular to the paper) of top pole 508. For convenience of fabrication, yoke 530 may also be formed directly on top surface 510 in a slot etched through first insulation layer 524. Reader portion 504 includes: bottom shield 520; MR sensor 518; read gap 522 (filled by read gap insulating layer 523); and top shield 513. Non-magnetic spacer 511 is optionally formed on top shield 513.

As can be seen, unlike that in previously shown perpendicular writers, the layers of writer portion 502 and reader portion 504 are formed in layers that are substantially parallel to one another. Because the layered configuration does not require the fabrication intricacy of some of the other device structures, smaller feature sizes (e.g., the distance from the ABS to the yoke) can be achieved than are possible using other head fabrication methods. With smaller feature sizes, the number of turns between coils 514 and 515 necessary to generate the magnetism needed to write to the magnetic medium is minimized to as few as one turn. This reduction in coil turns not only reduces the device area required for the coils, but also maximizes the efficiency of the device. In one configuration, coils 514 and 515 are connected at opposite ends of writer portion 502 by coil vias 534 and 536. The combination of coil 514, coil via 534, coil 515, and coil via 536 form a one-turn toroidal coil. Furthermore, because the distance between the end of coils 514 and 515 proximal to the ABS and the ABS is minimized, the reduction in magnetic flux intensity through top pole 508 before reaching the magnetic medium is minimized. Prior to introduction of the completed device into a disc drive, a thin coating of diamond-like carbon (DLC) is preferably applied at the ABS. The DLC coating serves to protect coils 514 and 515, top pole 508, and read sensor 518 from exposure to possibly damaging impurities on the recording medium. The DLC coating should be sufficiently thin such that its effect on the efficiency of the device is negligible.

The details of the properties and fabrication procedures of the components of transducing head 500 are described in more detail U.S. Pat. No. 6,513,228, which patent is incorporated herein by reference.

In accordance with the present invention, the low moment magnetic material or the high $H_C$ magnetic material may be advantageously used to form a part of the magnetic core such as bottom pole 512 (return pole), top shield 513 or yoke 530. It is expected that a reduction of the potential for side writing similar to that found in previous transducing head designs result.

Although the present invention has been described with reference to preferred embodiments, workers skilled in the art will recognize that changes may be made in form and detail without departing from the spirit and scope of the invention.

We claim:

1. A transducing head comprising:
   a main pole formed at least in part of a first magnetic material;
   at least one magnetic element spaced from the main pole, wherein the magnetic element provides a potential return path for a magnetic field produced by the main pole, and is formed at least in part of a second magnetic material having a magnetic property that reduces side writing at the magnetic element, the second magnetic material differing from the first magnetic material.

2. The transducing head of claim 1, wherein the first magnetic material has a first saturation flux density $Bs_1$ and the second magnetic material has a second saturation flux density $Bs_2$, where $Bs_2$ is lower than $Bs_1$ by at least 0.5 Tesla.

3. The transducing head of claim 2, wherein the difference between the first saturation flux density $Bs_1$ and the second saturation flux density $Bs_2$ is greater than about one Tesla.

4. The transducing head of claim 2, wherein $Bs_2$ is in a range of about 0.1 Tesla to about one Tesla.

5. The transducing head of claim 2, wherein $Bs_2$ is in a range of about 0.3 Tesla to about 0.6 Tesla.

6. The transducing head of claim 2, wherein $Bs_1$ is greater than about 1.5 Tesla.

7. The transducing head of claim 2, wherein the second magnetic material is selected from a group consisting of NiFeCu alloys, NiFeP alloys, NiFeB alloys, NiFeO alloys, and NiFeS alloys.

8. The transducing head of claim 1, wherein the second magnetic material has a coercivity in a range of about 10 Oersteds to about 1000 Oersteds.

9. The transducing head of claim 8, wherein the second magnetic material has a permeability greater than 50.

10. The transducing head of claim 8, wherein the material has a hard axis anisotropy field in a range of about 10 Oersteds to about 1000 Oersteds.

11. The transducing head of claim 8, wherein the second magnetic material is an alloy selected from the group consisting of CoFeHf, FeAlO, CoFeB, CoZrNb, CoAlPtO, FeCoNi, FeCoZrO, FeSiNi, NiFeNb, FeSi, CoZrO, and FeCoSi.

12. A transducing head comprising:
a pair of magnetic poles separated by a gap for writing data to a magnetic medium; and
means forming at least a portion of one of the poles for reducing side writing at that pole.

13. The transducing head of claim 12, wherein the means is a first magnetic material having a first saturation flux density $Bs_1$, wherein at least a portion of the other pole is formed of a second magnetic material having a second saturation flux density $Bs_2$, where $Bs_1$ is lower than $Bs_2$ by at least 0.5 Tesla.

14. The transducing head of claim 13, wherein the difference between the second saturation flux density $Bs_2$ and the first saturation flux density $Bs_1$ is greater than about one Tesla.

15. The transducing head of claim 13, wherein $Bs_1$ is in a range of about 0.1 Tesla to about one Tesla.

16. The transducing of claim 13, wherein $Bs_1$ is in a range of about 0.3 Tesla to about 0.6 Tesla.

17. The transducing head of claim 13, wherein $Bs_2$ is greater than about 1.5 Tesla.

18. The transducing head of claim 13, wherein the first magnetic material is an alloy selected from a group consisting of NiFeCu alloys, NiFeP alloys, NiFeB alloys, NiFeO alloys, and NiFeS alloys.

19. The transducing head of claim 12, wherein the means is a magnetic material having a coercivity in a range of about 10 Oersteds to about 1000 Oersteds.

20. The transducing head of claim 19, wherein the magnetic material is an alloy selected from the group consisting of CoFeHf, FeAlO, CoFeB, CoZrNb, CoAlPtO, FeCoNi, FeCoZrO, FeSiNi, NiFeNb, FeSi, CoZrO, and FeCoSi.

21. A magnetic core of a perpendicular read/write head, comprising:
a main pole formed at least in part of a first magnetic material;
a return pole separated from the main pole by a write gap at an end adjacent to a magnetic medium and formed at least in part of a second magnetic material exhibiting a low magnetic moment and a $B_S$ in a range of about 0.1 Tesla to about one Tesla, the second magnetic material differing from the first magnetic material; and
a magnetic back via connecting the main pole and the return pole at a point distal from the magnetic medium.

22. The magnetic core of claim 21, wherein the end of the return pole adjacent to the magnetic medium is formed of the second magnetic material.

23. The magnetic core of claim 21 wherein the second magnetic material is selected from a group consisting of NiFeCu alloys, NiFeP alloys, NiFeB alloys, NiFeO alloys, and NiFeS alloys.

24. The magnetic core of claim 21 wherein the the first magnetic material exhibits a high magnetic moment and a saturation flux density greater than about one Tesla.

25. The magnetic core of claim 24, wherein a portion of the main pole adjacent to the magnetic medium is formed of the first magnetic material.

26. The magnetic core of claim 24, wherein the first magnetic material has a saturation flux density greater than about 1.5 Tesla.

27. The magnetic core of claim 21, wherein the second magnetic material has a saturation flux density in a range of about 0.3 Tesla to about 0.6 Tesla.

28. The magnetic core of claim 21, further comprising a magnetic yoke flanking a portion of the main pole, wherein the magnetic yoke is formed at least in part of the second magnetic material.

29. A method comprising:
forming a main pole at least in part with a first magnetic material;
forming a magnetic element at least in part with a second magnetic material having a magnetic property that reduces side writing at the magnetic element, wherein the magnetic element is spaced from the main pole and provides a potential return path for a magnetic field produced by the main pole, and wherein the second magnetic material differs from the first magnetic material.

30. The method of claim 29, wherein the first magnetic material has a first saturation flux density $Bs_1$ and the second magnetic material has a second saturation flux density $Bs_2$, where $Bs_2$ is lower than $Bs_1$ by at least 0.5 Tesla.

31. The method of claim 29, wherein the second magnetic material has a coercivity in a range of about 10 Oersteds to about 1000 Oersteds.

* * * * *

UNITED STATES PATENT AND TRADEMARK OFFICE
CERTIFICATE OF CORRECTION

PATENT NO. : 7,102,854 B2
APPLICATION NO. : 10/678439
DATED : September 5, 2006
INVENTOR(S) : Feng Wang et al.

It is certified that error appears in the above-identified patent and that said Letters Patent is hereby corrected as shown below:

Column 6, Line 35, delete "116C", insert --115C--

Column 16, Line 10, delete the second occurrence of "the"

Signed and Sealed this

Twentieth Day of February, 2007

JON W. DUDAS
*Director of the United States Patent and Trademark Office*